(12) United States Patent
Fischer et al.

(10) Patent No.: US 6,909,850 B2
(45) Date of Patent: Jun. 21, 2005

(54) METHOD AND ARRANGEMENT FOR ESTABLISHING A CONNECTION BETWEEN SATELLITES

(75) Inventors: Edgar Fischer, Müllheim (CH); Andreas Märki, Erlenbach (CH)

(73) Assignee: Contraves Space AG, Zurich (CH)

( * ) Notice: Subject to any disclaimer, the term of this patent is extended or adjusted under 35 U.S.C. 154(b) by 487 days.

(21) Appl. No.: 09/740,752

(22) Filed: Dec. 18, 2000

(65) Prior Publication Data

US 2001/0005273 A1 Jun. 28, 2001

(30) Foreign Application Priority Data

Dec. 22, 1999 (CH) ............................................. 2357/99

(51) Int. Cl.[7] ............................................. H04B 10/00
(52) U.S. Cl. ........................ 398/131; 398/123; 398/129; 398/130
(58) Field of Search ............................... 398/121, 128, 398/140; 250/491.1

(56) References Cited

U.S. PATENT DOCUMENTS

| | | | |
|---|---|---|---|
| 5,659,413 A | | 8/1997 | Carlson |
| 5,710,652 A | * | 1/1998 | Bloom et al. ................ 398/129 |
| 6,178,257 B1 | * | 1/2001 | Alumot et al. .............. 382/145 |
| 6,462,846 B1 | * | 10/2002 | DeLong ....................... 398/135 |
| 6,535,314 B1 | * | 3/2003 | Mendenhall et al. ........ 398/121 |

FOREIGN PATENT DOCUMENTS

| | | |
|---|---|---|
| EP | 0831604 B1 | 6/1997 |
| EP | 0844473 A1 | 10/1997 |
| WO | WO 9105414 A | 4/1991 |

OTHER PUBLICATIONS

Skormin et al., *Mathematical Modeling and Simulation Analysis of a Pointing, Acquisition, and Tracking System for Laser-Based Intersatellite Communication*, Optical Engineering, Nov. 1993, p. 2749–2763, vol. 32 No. 11.

* cited by examiner

Primary Examiner—Jason Chan
Assistant Examiner—Dzung Tran
(74) Attorney, Agent, or Firm—Townsend and Townsend and Crew LLP; Guy W. Chambers

(57) ABSTRACT

Lightwaves (1), which carry data signals and beacon light, are used for establishing a connection between a receiver and a transmitter located remote from each other. An acquisition sensor (171) is provided for acquiring the lightwaves (1) in the receiver, which generates acquisition sensor signals (Sc) from the received lightwaves. The lightwaves (1), which are conducted over a telescope (2) and a beam splitter (R4), are fed to the acquisition sensor (171) as well as to a fiber nutator scanning device (5). Besides useful signals (Sa, Sb), an additional signal (Sw, Sm', Sm) is obtained with the aid of the scanning device (5), which is used for making the acquisition easier.

5 Claims, 3 Drawing Sheets

METHOD AND ARRANGEMENT FOR ESTABLISHING A CONNECTION BETWEEN SATELLITES

FIELD OF THE INVENTION

The invention relates to a method and an arrangement for establishing a connection between a receiver and a transmitter, located at a distance from the former, by means of lightwaves, which carry data signals and beacon light, wherein an acquisition receiver for acquiring the lightwaves is provided in the receiver, which generates acquisition sensor signals from the received lightwaves.

BACKGROUND OF THE INVENTION

Sometimes a "wide angle camera", in cooperation with a so-called beacon laser is used to determine the alignment data for establishing an optical communications connection between two satellites. To avoid more complex, and therefore more interference-prone, search algorithms, the camera is usually laid out in such a way that it can cover the entire uncertainty cone, which is created by the uncertainty of the position of the own and the opposite stations, as well as the uncertainty regarding tilting in the inertial systems of both stations. Because of the uncertainty cone, the camera must cover an angular area of approximately ±0.50°. However, at the same time the natural beam divergence of the communications beam being used comprises only a few microradians. This condition requires an extremely wide dynamic range of the ratio of visual angle/producible angular resolution. In addition, alignment errors between the optical device of the wide angle camera and the optical search device of the communications beam also have aggravating results. The transmission beam will move in a random manner within a defined solid angle area because of certain natural mechanical effects. Based on the limited resolution of the wide angle camera which can be achieved, as well as its limited electrical bandwidth, there is therefore a high degree of probability that the communications beam illuminates the opposite station only rarely. Thus, the opposite station is not provided the opportunity of becoming aligned with the received communications beam and in this way to initiate higher frequency "tracking" with a high degree of angular resolution. In the normal case, tracking of the opposite station in the communications mode takes place with the aid of the received communications light. Sensors with high spatial and/or electrical resolution are employed to obtain the spatial deviation signals (tracking signals).

For checking the optical alignment of two light sources in the course of coherent heterodyne reception, an arrangement is furthermore known from EP 0 831 604 A1, having a local laser and two detectors, each of which comprises two identical detector halves, which are respectively separated by a strip-shaped interruption, or gaps, in the photo diode electrode face between the adjoining halves, wherein the gaps of the two detectors are arranged orthogonally in respect to each other. This arrangement is used as a direction-selective optical monomode receiver. Here, an obscuration is provided in a receiving telescope of this arrangement, as well as in the beam path of the local laser. This makes it possible to generate an error signal for a spatial beam regulation of an optical heterodyne receiver, while preventing systematic losses and at the same time only minimally interfering with the data signal to be transmitted, along with a good signal-to-noise ratio.

Finally, an optical bench is known from EP 0 844 473 A1, whose bench structure is designed in such a way that, in case of a heat dilation of arms provided for connecting the receiving elements of various optical units, these receiving elements can be displaced without tilting transversely in respect to axes which assume defined angular positions in respect to each other and in relation to the bench structure. Such an optical bench can be combined with the arrangement mentioned at the outset.

Although such "tracking sensor" methods permit simultaneous communications and the determination of the spatial tracking error, the respective arrangements have been shown to be disadvantageous because of the relatively large adjustment outlay, in particular in the course of their manufacture.

OBJECT AND SUMMARY OF THE INVENTION

It is therefore the object of the invention to provide a method and an arrangement for establishing a connection between satellites in an acquisition phase, which results in a simpler adjustment of such a system.

Lightwaves (1), which carry data signals and beacon light, are used for establishing a connection between a receiver and a transmitter located remote from each other. An acquisition sensor (171) is provided for acquiring the lightwaves (1) in the receiver, which generates acquisition sensor signals (Sc) from the received lightwaves. The lightwaves (1), which are conducted over a telescope (2) and a beam splitter (R4), are fed to the acquisition sensor (171) as well as to a fiber nutator scanning device (5). Besides useful signals (Sa, Sb), an additional signal (Sw, Sm', Sm) is obtained with the aid of the scanning device (5), which is used for making the acquisition easier.

The structural outlay for the creation of such systems can be significantly reduced by means of the invention, which in the end leads to reduced demands made on complexity, electrical output requirements and mass.

Other advantageous embodiments of the invention ensue from the further dependent claims.

The invention will be explained in greater detail in what follows by way of example, making reference to the drawings.

DETAILED DESCRIPTION OF THE PREFERRED EMBODIMENTS

Figure 1:
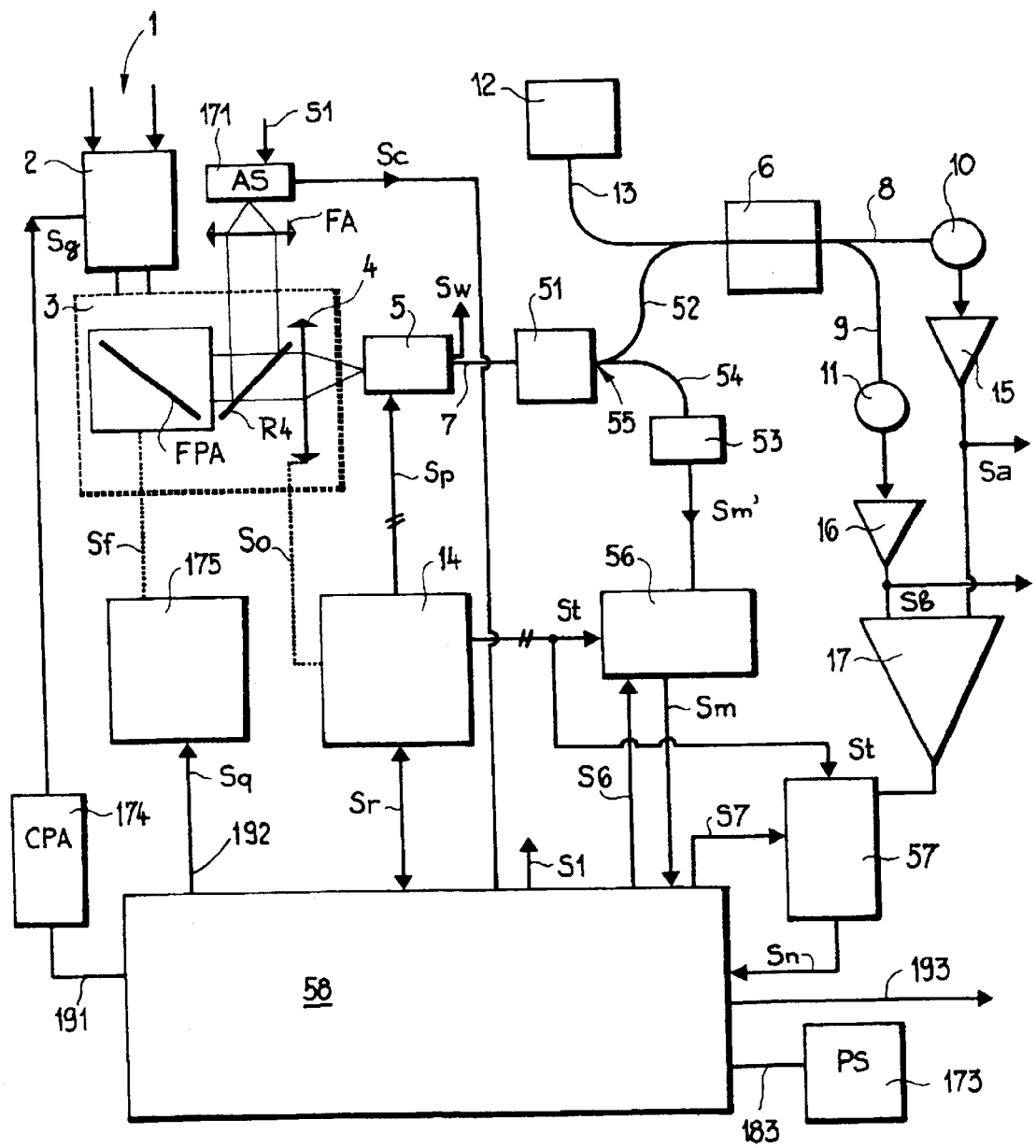
FIG. 1 is a schematic block diagram of an arrangement in accordance with the invention.

Similar to the arrangement known from the mentioned EP 0 831 604 A1, in accordance with FIG. 1 an Rx-wave or information lightwave 1 is received by means of a receiving unit consisting of a receiver telescope 2, a fine alignment mechanism 3 and a lens 4. The wave 1 also contains beacon light, which arrives not tightly bundled, but at a relatively wide angle.

In contrast to the mentioned arrangement, in accordance with the present invention the received information light wave 1 is fed via a fiber nutator 5, also referred to as a "scanning device," to an optical waveguide coupler 6. An end of a polarization-maintaining monomode fiber 7 can be connected to the fiber nutator 5 for conducting the beams received over the optical receiver unit to the optical waveguide coupler 6, and via further monomode fibers 8 and 9 to respectively one detector 10 or 11. However, in accordance with the present invention, the beams received via the optical receiver unit are preferably conducted over a chromatic diplexer 51 and a monomode fiber 52 for data light to the optical waveguide coupler 6. Such a fiber nutator 5 is essentially a deflecting unit with a fiber which is driven to nutate, for example by means of a piezo-mechanism. A further, preferably polarization-maintaining fiber 13 is connected to a local laser 12 for conducting the beams generated by the local laser 12 to the optical waveguide coupler 6, and then via the monomode fibers 8 and 9 to the two detectors 10 or 11. The detectors 10 and 11 need to be split, as in the known arrangement. The fiber nutator deflecting unit 5 can receive control signals Sp from a control device 14 via a bus or lines. The optical waveguide coupler 6 preferably is a 50%-to-50% coupler. By means of a polarization-maintaining fiber coupler it is possible to achieve a fiber coupler which is simple and simultaneously inherently stable over a long time.

In place of the mechanical fiber nutator as the deflecting unit it is also possible to employ an electro-optical deflector, wherein an electrical voltage creates a linear electrical field gradient via the aperture of an electro-optical crystal. An aperture of approximately 1 mm is easily achievable even with such a deflector.

The detectors 10 and 11 deliver signals Sa or Sb via respective amplifiers 15 or 16, which are employed as the useful signals. The low-frequency portion of these signals Sa and Sb are also supplied to the differential inputs of a differential amplifier 17. The arrangement of the invention additionally comprises a sensor 53, which is connected with the output of the diplexer 51 via a fiber 54, preferably a monomode fiber, as well as two discriminators 56, 57, a higher order system control 58 and a CPA (coarse pointing assembly) unit 174. The sensor or detector 53, which is faster than the acquisition sensor 171, can be a photodiode, for example. The input sides of the discriminators 56 and 57, which can be synchronous modulators and amplifiers, are respectively connected with an output of the sensor 53 or of the amplifier 17. A reflecting surface R4, which acts as a beam splitter, is also provided in the fine alignment mechanism 3 for deflecting the beams which, via a focusing installation FA, which is preferably fixed in place, then reaches an acquisition sensor AS 171 such is provided anyway in arrangements of this type, but in another form. The sensor 171 is a large-surfaced matrix sensor with a surface of 6×8 mm$^2$, for example, which is scanned and therefore is slow. The higher order system control 58 is provided on the input side with output signals Sc, Sm and Sn from the aquisition sensor 171 or from the discriminators 56, 57.

The system control 58 has various outputs for delivering signals via lines 191, 192, 193 to respectively one CPA unit 174, an electronic control device FPA (fine pointing assembly) 175, or a PAA (point-ahead assembly) unit, and in addition it is bidirectionally connected with the control device 14, which is also called deflector selection. To this end the receiver telescope 2 is controlled by an output signal Sg of the CPA unit 174, the fine alignment mechanism 3 by a control signal Sf from the unit 175, and the lens 4, the fiber nutator deflecting unit 5 and the discriminators 56, 57 by signals So, Sp or St (FIG. 1). The signals Sp and St are quadrature signals (sin ωt, cos ωt), such as are used for creating Lissajous' figures.

Figure 2:
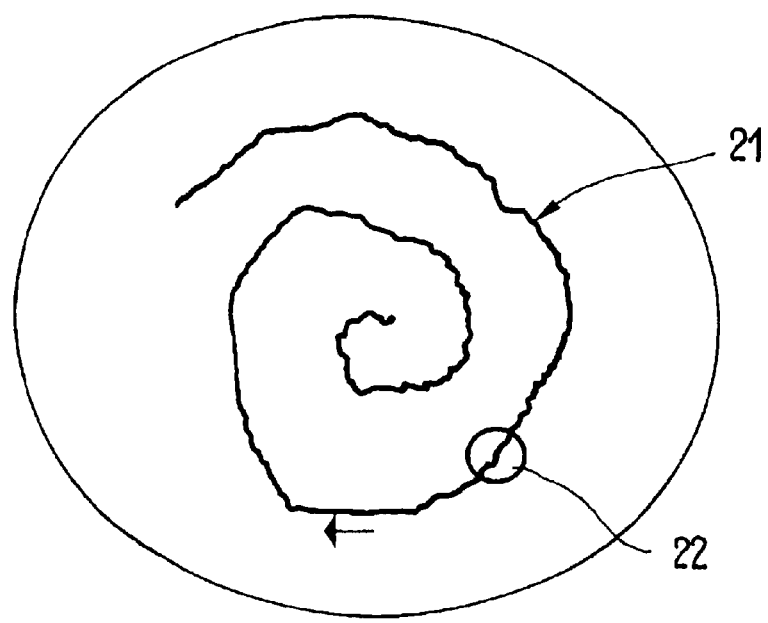
FIG. 2 is a schematic representation of the movement of a light spot on the front of a lightwave fiber.

FIG. 2 shows how a fiber end light spot 22, guided by this controlled movement 21, is projected on a diametrical surface at the end of the lightwave fiber of the deflecting unit 5. The light spot 22 can be brought at least approximately up to the center of the lightwave fiber by means of the control.

Figure 3:
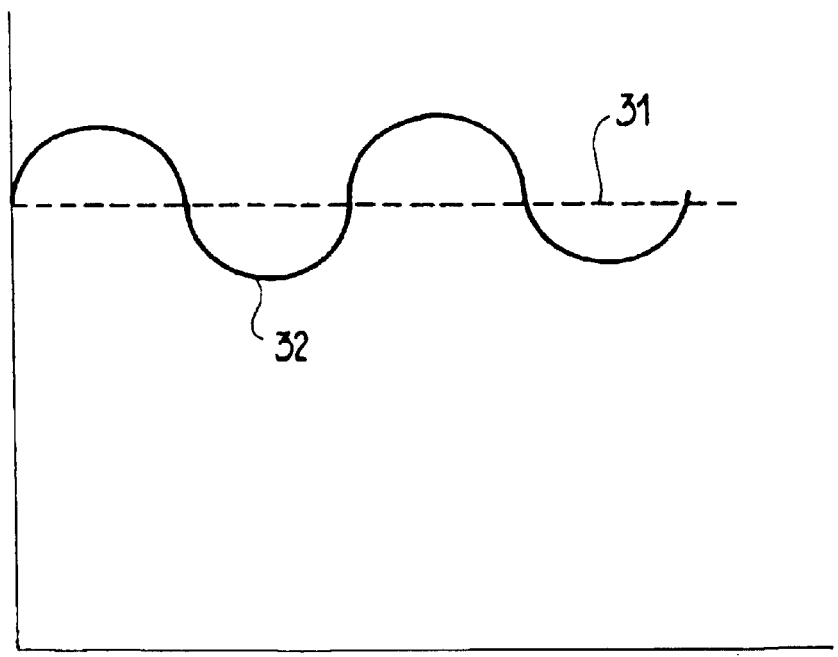
FIG. 3 is a schematic diagram of the chronologically asymmetric intensity signal on the detectors, if the fiber axis does not rotate concentrically around the optical axis of the opto-mechanical system.

FIG. 3 shows how the mean intensity signal 31 on the detectors 10 and 11 has an overlaid modulation signal 32 if scanning by the fiber axis is not performed concentrically around the optical axis of the opto-mechanical system. The task of the system control 58 lies in moving the fine alignment mechanism 3, the end of the fiber 7 and/or the lens 4 in such a way, that this modulation signal 32 reaches a minimum value or a zero value.

Figure 4:
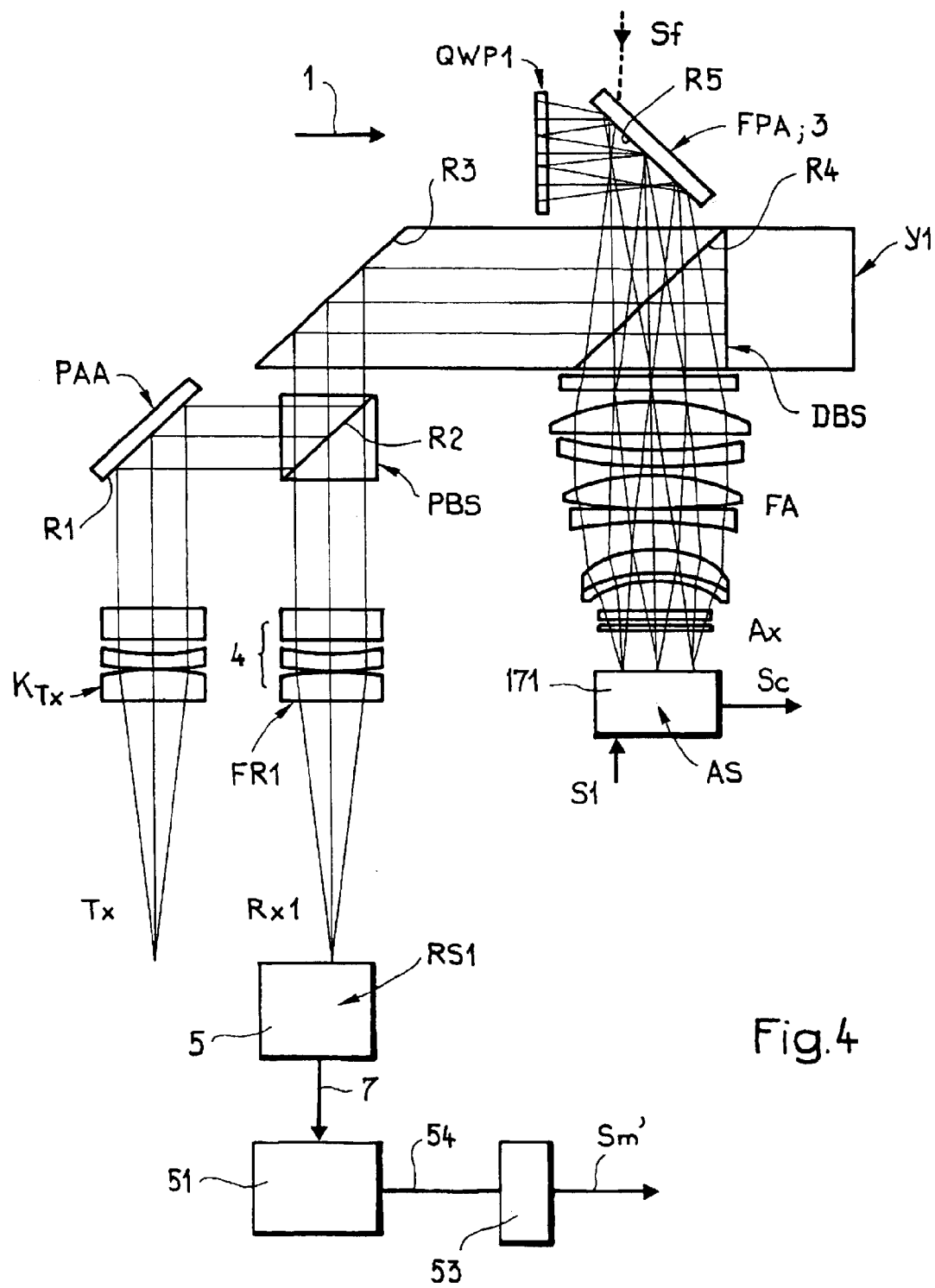
FIG. 4 is a simplified representation of a device for calibrating the deviation from its nominal position of a receiving beam in a terminal.

As can be seen in FIG. 4, one terminal can be provided for three channels, namely for a transmitting channel Tx, for a receiving channel Rx1 with a fiber nutator 5 (FIGS. 1 and 4), which is considered to be the receiving sensor RS1, and for an acquisition channel Ax with an acquisition sensor AS 171 (FIGS. 4 and 1).

In accordance with FIG. 4, a collimator device $K_{TX}$, a first reflecting surface R1, a second reflecting surface R2, a third reflecting surface R3, a fourth reflecting surface R4, a fifth reflecting surface R5 and a quarter-wave plate QWP1 are arranged in the transmitting channel Tx, viewed in the beam direction. The first reflecting surface R1 is a component of a point-ahead assembly PAA. The second reflecting surface R2 is a component of a polarizing beam splitter PBS, which is embodied in such a way that it is reflecting for beams with the polarization of the transmitting beam, and permeable as free of losses as possible for beams with the polarization of the receiving beam. The fourth reflecting surface R4 is formed by a dichroitic beam splitter DBS, for example. The fifth reflecting surface R5 is formed by a fine pointing assembly FPA (FIGS. 4 and 1). The quarter-wave plate QWP1 converts the light of the transmitting channel, which has been linearly polarized up to now, into circularly polarized light for transmission through space to the partner terminal.

The receiving channel Rx1 comprises, also viewed in the beam direction, the quarter-wave plate QWP1, the fifth reflecting surface R5, the dichroitic beam splitter DBS, the third reflecting surface R3, the reflecting beam splitter PBS, a focusing device FR1 and the fiber nutator 5 or the receiving sensor RS1. The quarter-wave plate QWP1 converts the circularly polarized light from the partner terminal arriving from space into linearly polarized light.

The purpose of the beam splitter PBS is the differentiation between the transmitting and receiving beams. It is needed in the present exemplary embodiment or in cases, in which the transmitting and receiving beams differ by different polarization. In other exemplary embodiments, wherein the transmitting and receiving beams differ by different wavelengths, for example, a DBS would be used in place of a PBS.

The transmitting channel is used for transmitting data to the partner terminal, and the receiving channel for receiving data from the partner terminal, each one in an operational mode in which both terminals have already been roughly aligned with each other. The coarse pointing assembly 174 (FIG. 1, CPA) is used for rough alignment. It comprises on the one hand a light beacon, arranged at the partner terminal, for emitting a beacon light, and on the other hand the acquisition channel at the terminal for receiving the beacon light. The acquisition channel branches off the receiving channel Rx at the dichroitic splitter DBS and has a focusing device FA (FIG. 4) as well as the acquisition sensor AS. The detection range AA of the acquisition sensor AS is considerably greater than the detection range RA of the receiving sensor.

The arrangement in accordance with the invention operates as follows: the lightwave 1 comprises the communications beam, which transmits data, also called data light, and beacon light. The data light is tightly bundled and probably cannot hit the opposite station because of the "wobbling" resulting in the acquisition phase. The beacon beam is less bundled, which makes the permanent illumination of the opposite station possible. Thus, there is first the possibility to track the received beacon light with the acquisition sensor 171. An attempt can be simultaneously made with the leak light to switch over to the fiber nutator 5. Since all this occurs during permanent illumination by the opposite station, no "twinkling" effect occurs, such as would occur if the communications beam were to be used. Thus there is time for locating the light spot, if the fiber nutator is not immediately acquired.

The lightwave received by the optical receiving unit 2, 3 (FIG. 1), or from the elements FPA, R4, R3, PBS and FR1 (FIG. 4) is approximately focused on the center of the monomode fiber 7 (FIG. 1) in the fiber nutator 5 (FIGS. 1, 4) via the fine alignment unit 3 and with the aid of the lens 4, or of the elements PBS, FR1 (FIG. 4) when the control unit is inactive. When the control unit 14 (FIG. 1) is active, a movement (FIG. 2) of the fiber end 22 around the center of the monomode fiber 7 is caused by the fiber nutator 5. The fiber end 22 preferably describes a high-frequency circular motion around the optical axis of the optical receiving device. Although the end of the fiber 7 is moved by the nutator, there is no longer a spatial movement of the exiting light at the end of the fiber, at the detectors 10 and 11. Instead, the rotating movement by means of the nutator 5 causes an intensity modulation (FIG. 3) if the scanning motion does not take place exactly concentrically around the light spot.

The high-frequency mechanical scanning movement of the fiber end caused by the nutator 5 (FIGS. 1, 4), which in general can be a deflecting unit, can be controlled by means of a lateral displacement mechanism or by means of a bending element, for example. Rapid lateral displacement units with small movements are known, for example, from opto-electronic reading devices, such as CD players. But bending elements can be simply produced from small piezo-ceramic tubes with segmented electrodes. These small tubes are only fixed in place in one area, so that they can be bent in the linear direction by the piezo effect. It is common to all mechanisms that they are controlled by so-called I-Q signals. After I-Q demodulation of the intensity signal has taken place, the spatial error between the light spot 22 and the fiber axis is finally obtained. The error signals Sm and Sn (FIG. 1) cause the minimization of the deviation error via the system control 58.

The relative offset between the intensity distribution of the Rx light in the focal plane of the lens 4 and the end of the fiber 7, created by the rotary movement, therefore causes a chronologically asymmetric intensity signal on the detectors 10 and 11 if scanning of the fiber axis is not performed concentrically around the optical axis of the opto-mechanical system. Thus, the scanning point detector is replaced by the mode field of a monomode fiber, and this at a very good approximation. The scan radius should not exceed ⅒th of the mode field radius for preventing too large a signal decay of the light coupled into the fiber.

The lightwave guided over the chromatic diplexer 51 is divided into two almost identical partial beams by the beam splitter, which are fed to one of the respective detectors 10 and 11 after the light from the local laser 12 has been coupled into the light flow via the optical waveguide coupler 6. Respectively two error portion signals are generated by the two detectors 10, 11, which are converted into voltages Sa or Sb by means of an appropriate front end transimpedance amplifier 15 or 16. A spatial error signal is obtained from the signals Sa and Sb, which appears as the signal Sn($\Delta x$, $\Delta y$) at the output of the circuit 57 and is used for continuous tracking operations. By an addition of the error portion signals Sa and Sb having the correct signs, an output signal corresponding to the original data or communications signal results on the other side. A tracking sensor TS, which is present in such devices besides an acquisition sensor AS and a pointing sensor 173, is therefore replaced by the invention.

The overlay of the local laser wave with the Rx wave takes place only in the glass fiber, so that the spatial correlation degree between the local laser and the Rx field will equal 1, i.e. an overlay guaranteed to be free of streaks takes place. It is then possible in connection with the optimization during adjustment, or a later optimization during operation, to assume an overlay guaranteed to be free of streaks, and an adjustment to the absolute amplitude maximum can be performed. This has been shown to be very advantageous compared with the free beam overlay wherein, in contrast to the method of the invention, it can happen that interference streaks caused by a tilt angle can occur when the two waves are overlaid on each other. It is then no longer possible to find the optimal, i.e. streak-free, adjustment state by means of the intensity maximum alone. Moreover, in that case the distance between the levels of the main maximum and one of the side maxima is relative short. There is always the latent danger that the tracking regulator will get out of step and perform a regulation in accordance with a side maximum of the intensity distribution, which then considerably limits the linear regulating range.

The uses of fiber nutation known so far require a coherent optical heterodyne reception. The reason for this is primarily the attainable good suppression of the effects of interference light. However, during the acquisition phase, in which an optical transmission path is being built up, there are no interfering natural light sources in the field covered by the acquisition sensors, so that in accordance with the invention the fiber nutators can also be employed already in the acquisition phase, although no heterodyne reception takes place.

Since fiber nutators have a selectively narrow field of coverage because of their monomode design, it is possible to achieve very high solid angle resolutions (sub-micro radians). Moreover, the beam of the beacon laser is not as tightly bundled as the communications beam, therefore it is possible to assure a permanent illumination of the opposite station already by using the wide angle camera.

During the acquisition phase the light from the beacon laser(s), which comes from high-output laser diodes, for example, is coupled into multimode fibers. The polarization state of the emitted light is therefore arbitrary. "High" losses therefore inherently occur on the receiving side (FIG. 4) during the chromatic splitting R4 of the wavelengths of the beacon and communications light. The diplexers R4 employed are optimized for low transmission losses of the communications light. Therefore, in respect to the beacon light, "cross talk" of the beacon wavelength into the communications channel always occurs, i.e. on the receiving end beacon light appears in the direction of the communications receiver. Thanks to the fiber front end which, in accordance with the invention is used according to the fiber nutation principle, there is the opportunity of also using the light leaked from the acquisition channel for the generation of tracking signals.

The acquisition sensor 171 and the coarse pointing assembly 174 operate in a manner known per se. Therefore there is the opportunity initially, or at the start, of tracking the received beacon light with the aid of the signal Sc wherein, as a replacement, a control loop via the elements 58, 174, 2, FPA, R4, 171 is used for tracking which, because of the sensor 171, has a slow control of band width, for example on the order of 50 Hz.

The signal Sn at the output of the discriminator 57 is basically used in the form of permanent tracking operations by the system control 58. In this case an inner control loop operates, which is defined by the elements 57, 58, 175, 3, 51 and 5. In addition an outer control loop also operates, which is defined by the elements 58, 174 and 2. These control loops are very fast, because the sensors 10, 11 and 53, which quasi constitute point sensors with a glass fiber, can operate much faster than the sensor 171. In contrast to this, the signal Sm at the output of the discriminator 57 is only used temporarily, namely only at the start, possibly within a maximum period of time of three minutes, for example. The system control 58 has means to determine whether the signals Sc, Sm and Sn are usable. Since the beacon light is received at a relatively wide angle, reception of the signal Sc is not problematical. This signal Sc is therefore used at the start until it is determined by the system control 58 whether the signal Sm is usable, i.e. whether or not the fiber nutator receives sufficient leaked light for generating tracking signals. From this moment on it operates with this signal Sm, wherein for reasons of reliability it is possible to continue running the sensor 171 in the acquisition phase. If thereafter it is determined by the system control 58 that the signal Sn is valid, or that the communication channel operates correctly, it takes over this signal Sn for a more accurate continuous tracking operation. It is possible at this time to switch off the signal Sm from the discriminator 56 by means of an enable signal S6, as well as to switch off the signal Sc no later than this time by means of an enable signal S1. These enable signals S1 and S6, as well as a further enable signal S7 for the discriminator 57, are generated in the system control 58, which needs the signals Sc, Sm and Sn at the same time for controlling the CPA and the FPA. But the control 14 always operates, for example with the aid of a clock generator.

The principle in accordance with the invention also applies to incoherent systems. Inherent system constructions or direct detection systems are sometimes produced in that the incoming light from the opposite station is focused onto a so-called avalanche diode. Inherently such systems are not monomode receivers, i.e. the receiver accepts light from a solid angle area which is greater than the solid angle area for limited diffraction systems described by diffraction theory. To minimize interfering background radiation, it is then necessary to employ optical filters with extremely narrow bandwidth. Up to now it has not been possible to produce such filters for long-term space travel applications.

Usually a separate tracking laser is used for tracking the opposite station. These lasers are distinguished by providing good wavelength stabilization. Again, optical filters with extremely narrow bandwidth (often so-called "atomic line filters") are placed in front of the receiver diode in the receiving station. The structural outlay for producing such systems can be significantly reduced by employing monomode receiver units. In the end this leads to savings regarding complexity, power requirements and mass. It is possible by using the monomode front end to return the spatial acceptance range of the receiver to the diffraction limits. This leads to a considerable reduction of the background radiation reaching the receiver. As a result, the demands made on the optical band pass filters used can be clearly reduced.

Moreover, by employing monomode receivers it is possible to reduce the scattered light suppression (crossover into the transmitting channel) for the receiving channel to a significant degree. Suppression ranges of at least 50 dB can be achieved with this type of receiver, which could only be produced by means of band pass filters with considerably greater outlay. If it is possible to do without approximately 5% of the received output in the communications channel, the additional tracking system can be completely omitted. The use of a monomode receiver module in combination with a spatial search process, for example the fiber nutation principle, permits this realization. In FIG. 1, this situation is indicated by a possible additional connection between a further output of the fiber nutator 5 for a signal Sw, and of the unit in which the lens 4 is located for controlling it. This means that in accordance with the invention it is possible to use this additional output signal Sw of the fiber nutator 5 for the direct control of the FPA 3.

By means of using the receiving fiber 7, which can be relatively long, it is possible to house the receiver front end RFE, i.e. the detectors 10, 11 and the amplifiers 15, 16, at a relatively great distance from the optical devices. The lightwave fibers can be housed in a flexible protective cable for this purpose, or have a flexible sheathing. Thus the heat being generated at the RFE is optimally divorced from the optical devices and it is no longer necessary to fear thermal maladjustments in the optical sub-system induced by the RFE. Therefore the optical elements 2, 3, 4 and 5 can be arranged at a relatively large distance from the electronic data devices and the RFE, which are located in the remote electronics unit. Because of the mobility of portions of the fiber, it is therefore possible to remove all problems which result from the use of long microwave lines (damping, EMC [electromagnetic compatibility]), even if it is necessary to extend a coaxial line from the electronics unit to the optical head in order to send the low-frequency tracking error signals (BW≈10 kHz) back to the front.

Furthermore, the arrangement in accordance with the invention has been shown to be particularly advantageous in view of the fact that it has great long-term stability, that it can be optimized by means of a relatively simple algorithm in connection with beam overlay, that with high-frequency data flows (clock rate=1000 Mbps) no particularly significant damping of the connecting line between the fiber nutator and the remote receiver front end RFE (cable length>3 m) results, that it does not require any additional electronic line driver devices, that the cables need not be laid fixed in place, so that even movable partial areas are possible, that it is unproblematical in respect to EMC interferences, that RFEs with bandwidths>>1 GHz can be used with broadband systems, and that a great heat generation from the HF electronic devices is avoided in the immediate vicinity of the optical devices. The arrangement in accordance with the present invention can in this way advantageously replace the elements 16 and 26 of the optical bench in accordance with the mentioned EP 0 844 473 A1.

With an embodiment of the invention, the system control 58 and/or the control 14 can be designed in such a way that a movement of the movable end of the lightwave fiber 7 around the center of the focusing point 22 of the information wave 1 is caused when the lens 4 is at rest.

With another embodiment of the invention, the system control 58 can cause a movement of the lens 4 in order to move the focused light spot 22 of the information wave 1 around the center of the lightwave fiber 7 when the lightwave fiber is at rest.

The arrangement in accordance with the present invention can be used for the same or similar purposes as those in the mentioned patent application EP 0 831 604 A1.

In such a system an optical traveling wave amplifier, for example an optical semiconductor amplifier, an erbium-doped fiber amplifier or an Nd- or Yb-doped fiber amplifier, can be provided in the transmitter. To suppress interfering background light, spatial filtering by means of optical monomode wave guide coupler 6 can be provided.

The exemplary embodiments explained above are to be merely understood as means of illustrating the application of such an arrangement. However, other embodiments, which become immediately apparent to one skilled in the art from these, also contain the basic concept of the invention.

What is claimed is:

1. A method for establishing a connection between a receiver terminal and a transmitter terminal, located at a distance from each other, comprising the steps of:

sending from said transmitter terminal toward said receiver terminal both a first tightly bundled lightwave carrying data signals and a second wider angle beacon lightwave to assist in receptive alignment of said first data signal lightwave;

using an acquisition sensor and a receiving sensor at said receiver terminal to acquire said wider beacon lightwave and generate internal control signals to better align said receiving sensor to receive said data signals;

using said receiving sensor to receive said data signals once proper alignment has been achieved;

wherein light from said receiving sensor is conducted over a first lightwave fiber to a diplexer, and light is split off from this diplexer and conducted to a detector over a second lightwave fiber, which provides an additional signal for making acquisition easier;

further wherein light, which arrives via the first lightwave fiber and the diplexer, is also conducted to an optical waveguide coupler, in which this light, and light from a local laser conducted through a third lightwave fiber, are mixed, wherein the mixed light is split into two parts, each of which reaches a further detector via respective further lightwave fiber for generating at least one error signal.

2. A device for receiving a first tightly bundled lightwave carrying data signals and a second wider angle beacon lightwave from a distant transmitter, comprising:

a receiver telescope and a fine alignment mechanism with a beam splitter to receive both said first and second lightwaves, which beam splitter is designed to provide light via optical fibers to an acquisition sensor, as well as to a receiving sensor in order to properly orient said device for data reception, wherein, when properly oriented, said receiving sensor receives said data signals from said first lightwave;

wherein the receiving sensor is connected via a first lightwave fiber with a diplexer, downstream of which a detector is connected via a second lightwave fiber and provides an additional signal for making acquisition easier;

further comprising an optical waveguide coupler, whose input is connected via a third lightwave fiber with the diplexer and which, with coherent heterodyne reception, mixes light arriving from the diplexer and light from a local laser, conducted over a fourth lightwave fiber, and split into two parts, which reach a detector via a respective further lightwave fiber for generating at least one error signal.

3. The device in accordance with claim 2, further comprising a first detector connected with a discriminator, which delivers an additional signal to a system control.

4. The device in accordance with claim 3, further comprising a second discriminator, connected downstream of said detector, which delivers at least one error signal to said system control.

5. The device in accordance with claim 3, wherein the receiving sensor is connected to a control, which provides command signals for a discriminator.

* * * * *